US012168889B2

(12) United States Patent
Zolotinsky

(10) Patent No.: US 12,168,889 B2
(45) Date of Patent: Dec. 17, 2024

(54) MECHANICAL LOCK AND METHOD OF OPERATION THEREOF

(71) Applicant: Felix Zolotinsky, Auburndale, MA (US)

(72) Inventor: Felix Zolotinsky, Auburndale, MA (US)

( * ) Notice: Subject to any disclaimer, the term of this patent is extended or adjusted under 35 U.S.C. 154(b) by 410 days.

(21) Appl. No.: 17/191,693

(22) Filed: Mar. 3, 2021

(65) Prior Publication Data

US 2022/0056732 A1 Feb. 24, 2022

Related U.S. Application Data

(63) Continuation of application No. 15/629,734, filed on Jun. 21, 2017, now abandoned.

(60) Provisional application No. 62/493,164, filed on Jun. 23, 2016.

(51) Int. Cl.

| | |
|---|---|
| ***E05B 17/18*** | (2006.01) |
| ***E05B 27/00*** | (2006.01) |
| ***E05B 29/00*** | (2006.01) |
| ***E05B 33/00*** | (2006.01) |
| ***E05B 35/00*** | (2006.01) |

(52) U.S. Cl.

CPC ........ *E05B 17/186* (2013.01); *E05B 27/0028* (2013.01); *E05B 27/0057* (2013.01); *E05B 27/0082* (2013.01); *E05B 29/0006* (2013.01); *E05B 29/0013* (2013.01); *E05B 29/0053* (2013.01); *E05B 29/0066* (2013.01); *E05B 33/00* (2013.01); *E05B 35/00* (2013.01)

(58) Field of Classification Search

CPC ........ E05B 17/14; E05B 17/18; E05B 17/186; E05B 27/0028; E05B 27/0057; E05B 29/0006; E05B 29/0013; E05B 29/0053; E05B 29/0066; E05B 33/00; E05B 35/00; E05B 17/181; E05B 27/0082

See application file for complete search history.

(56) References Cited

U.S. PATENT DOCUMENTS

| | | | | | |
|---|---|---|---|---|---|
| 1,648,251 | A * | 11/1927 | Zygmunt | E05B 17/185 | 70/455 |
| 2,179,947 | A * | 11/1939 | Miller | E05B 27/00 | 70/DIG. 37 |
| 3,029,626 | A * | 4/1962 | Jacobi | E05B 29/0013 | 70/366 |
| 3,367,155 | A * | 2/1968 | Kobrehel | E05B 29/0013 | 70/377 |
| 3,367,156 | A * | 2/1968 | Johnstone | E05B 29/0013 | 70/377 |
| 3,604,231 | A * | 9/1971 | Buschi | E05B 17/14 | 70/419 |
| 4,031,730 | A * | 6/1977 | Kern | E05B 17/14 | 70/423 |
| 4,485,648 | A * | 12/1984 | Rabinow | E05B 29/00 | 70/495 |
| 4,561,270 | A * | 12/1985 | Spreng | E05B 29/0066 | 70/377 |
| 4,599,877 | A * | 7/1986 | Rabinow | E05B 21/06 | 70/366 |

(Continued)

*Primary Examiner* — Christopher J Boswell

(74) *Attorney, Agent, or Firm* — Ilya R. Lapshin; IRL Legal Services, LLC

(57) ABSTRACT

A lock including a set of tumblers preserving their position after contact with a key to permit blocking of the keyhole during the opening process.

5 Claims, 5 Drawing Sheets

(56) References Cited

U.S. PATENT DOCUMENTS 5,934,121 A * 8/1999 Chen .................... E05B 21/066
70/377
5,946,957 A * 9/1999 Yamamoto ........... E05B 17/186
70/423
7,114,357 B2 * 10/2006 Armstrong .......... E05B 29/0066
70/495

* cited by examiner

Prior Art

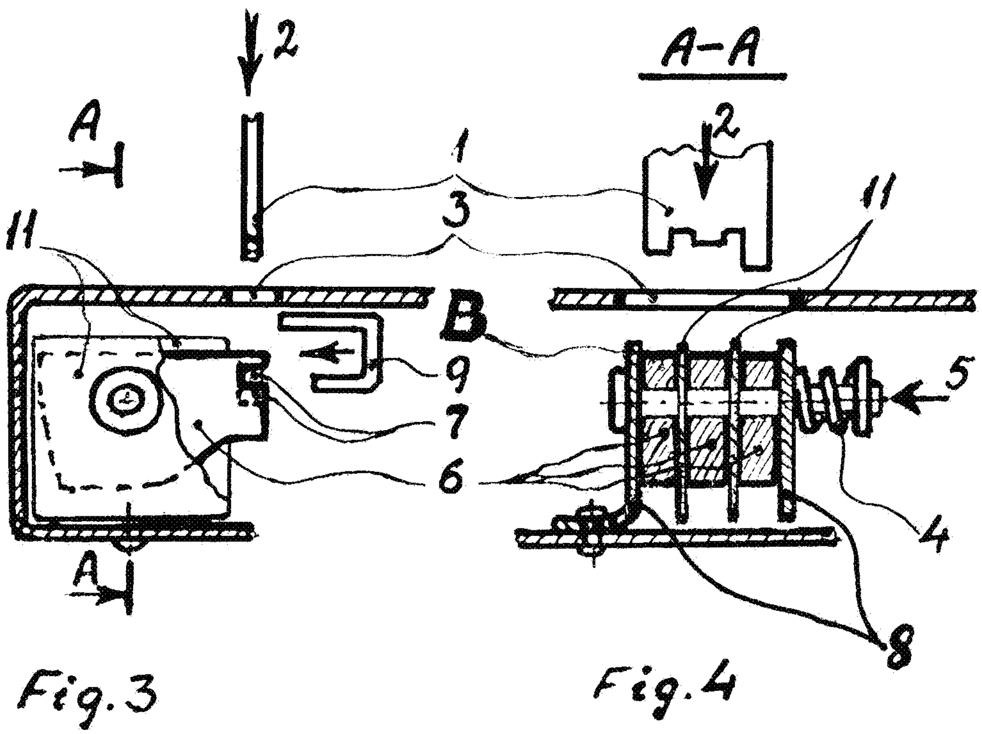
Fig.3
Fig.4
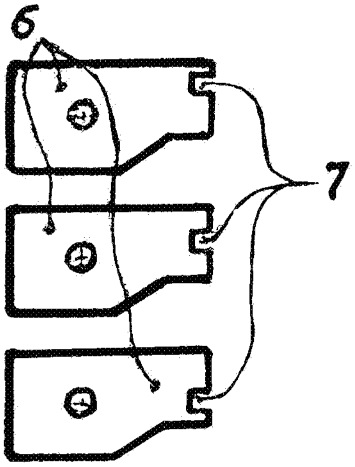
Fig.5

MECHANICAL LOCK AND METHOD OF OPERATION THEREOF

RELATED APPLICATIONS

This application is a continuation of U.S. application Ser. No. 15/629,734, filed Jun. 21, 2017, which claimed the benefit under 35 USC 119(e) of U.S. Provisional Application No. 62/493,164, filed on Jun. 23, 2016, all of which are incorporated herein by reference in their entirety.

BACKGROUND OF THE INVENTION

A common design of mechanical locks operated with a physical key involves using movable tumblers supported by springs or spring-loaded. The common types of tumblers are pin tumblers and lever tumblers shown in FIG. 1. The tumblers block the movement of a bolt or a latch until the correct key contacts them and moves them into the positions the combination of which releases the bolt or the latch. The tumblers tightly contact the coded portion of the key's blade and their configuration corresponds to the key's blade shape. In other words, the key makes an imprint of its blade on the set of tumblers. This imprint is not stable; it is destroyed as soon as the tumblers lose their contact with the key. The tumblers are supported by springs, and under the springs' pressure they immediately return back to their initial position, as soon as the key is removed, and the normal opening process is interrupted. The key has to be in contact with the tumblers during the entire opening process, therefore in such locks, the keyhole cannot be blocked (to prevent access to the lock's mechanism) during the opening process. Because of this such locks are vulnerable to picking through the key hole; and many tools exist for this purpose.

A set of movable spring-loaded parts—tumblers—is a core part of the vast majority of mechanical locks operated with a physical key. The tumblers differ in shape, and the locks depending on the shape are called pin tumblers locks, lever tumblers locks, etc. These types of locks are currently in wide use. The tumblers are the pieces that interact directly with a key in the process of opening a lock; the key sets them in the positions according to the key's coded portion. Depending on the configuration of tumblers set by the key, the tumblers either keep the bolt in the locked position or release the bolt. The bolt is released only if the configuration of the tumblers is set by a key intended for the lock. The tumblers are in tight contact with the coded portions of the key's blade, thus the tumblers are aligned in their configuration according to the shape of the key's blade. Therefore, the key creates an imprint of its blade on the set of tumblers. In currently used locks the key's imprint, i.e. the configuration of tumblers, is not stable, it is destroyed as soon as the tumblers lose their contact with the key because the tumblers are spring-loaded and under their springs' pressure the tumblers return immediately back to their initial positions. To effectuate the opening process, the key has to be in the keyhole in contact with tumblers during the entire opening process; therefore, the keyhole cannot be blocked at this time. This makes current locks very vulnerable to picking through the keyhole. Many types of pick tools exist now for this purpose.

SUMMARY OF THE INVENTION

Embodiments of the invention include a method of opening a lock with a key, comprising inserting the key into a keyhole in the lock; bringing the key in contact with tumblers to make the configuration of the tumblers match the shape of the contacted portion of the key; removing the key so that the configuration of the tumblers is maintained; blocking the keyhole; and if and only if the configuration of the tumblers matches the lock's configuration, opening the lock.

In some embodiments, the tumblers are pin tumblers.

In some embodiments, wherein the tumblers are lever tumblers.

In some embodiments, wherein the configuration of the tumblers is maintained by friction.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWINGS

In the accompanying drawings, reference characters refer to the same parts throughout the different views. The drawings are not necessarily to scale; emphasis has instead been placed upon illustrating the principles of the invention.

FIG. 3 shows one view a lock embodying the invention with its key outside the lock.

FIG. 4 shows another view a lock embodying the invention with its key outside the lock.

FIG. 5 shows tumblers used in a lock embodying the invention.

DETAILED DESCRIPTION OF THE PREFERRED EMBODIMENTS

Figure 1:
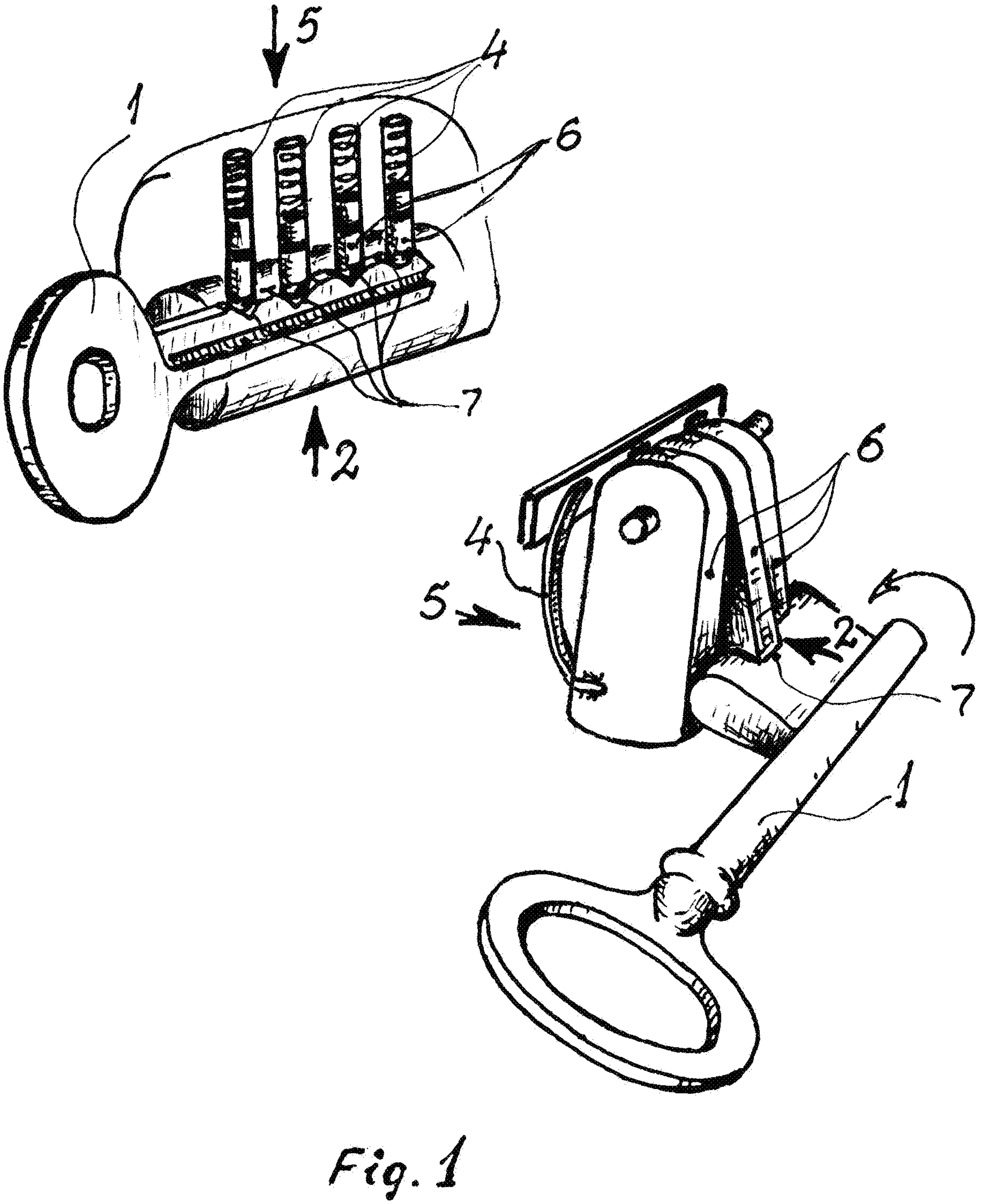
FIG. 1 shows schematic construction of existing locks
Figure 2:
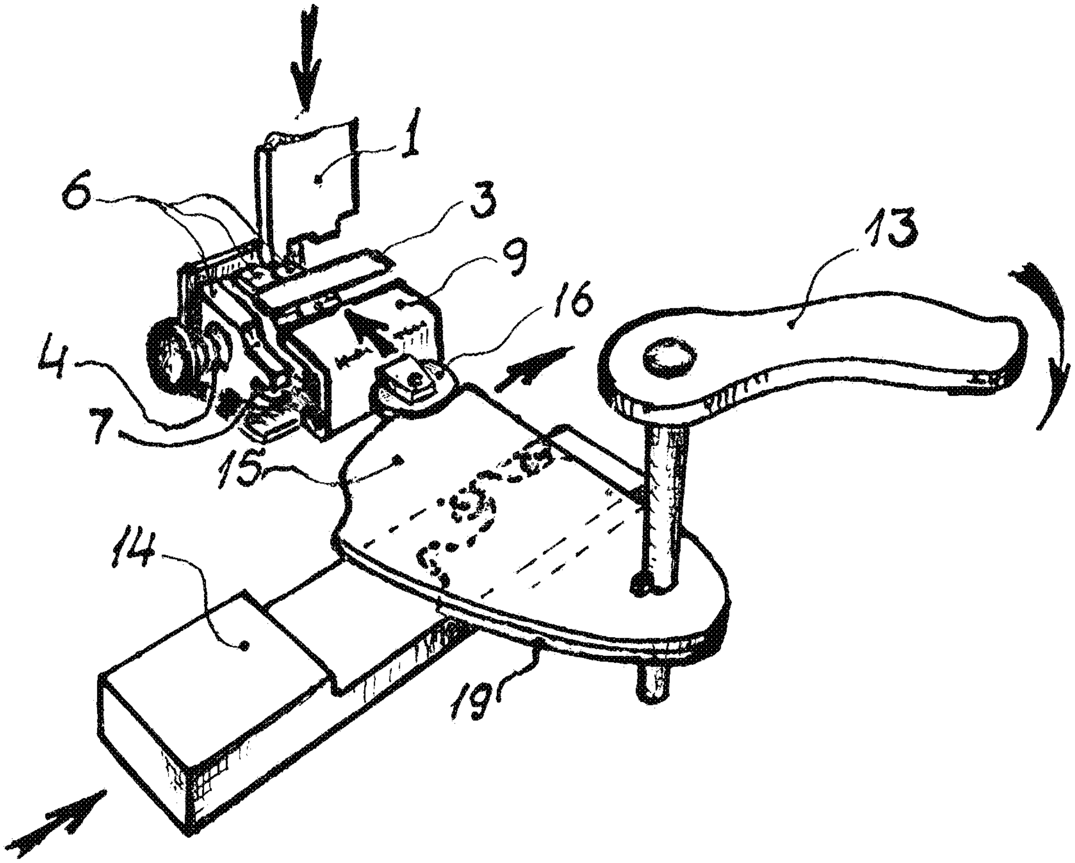
FIG. 2 shows functioning of an embodiment of the invention.
Figure 6:
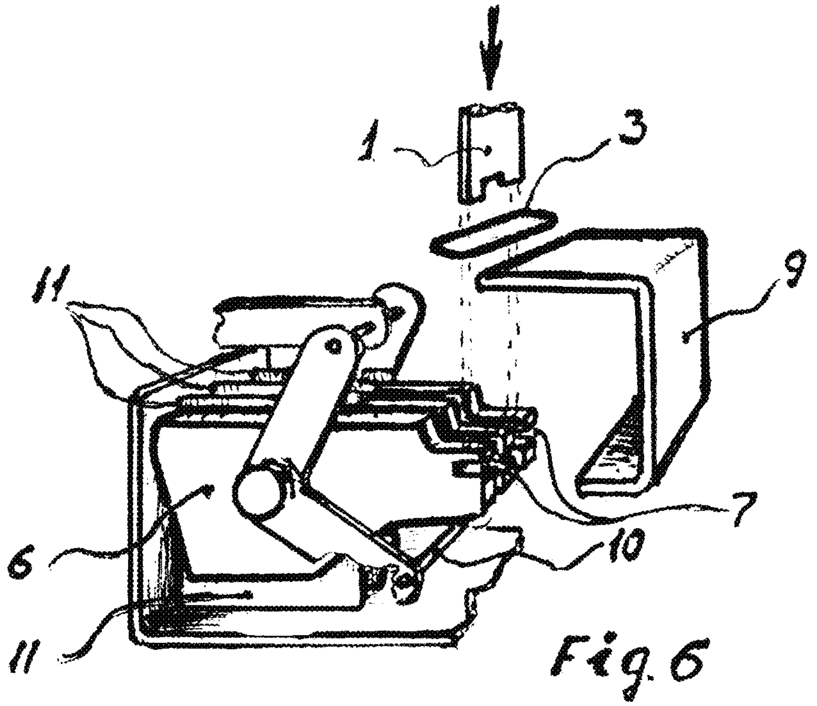
FIG. 6 shows a third view of a lock embodying the invention with its key outside the lock.
Figure 7:
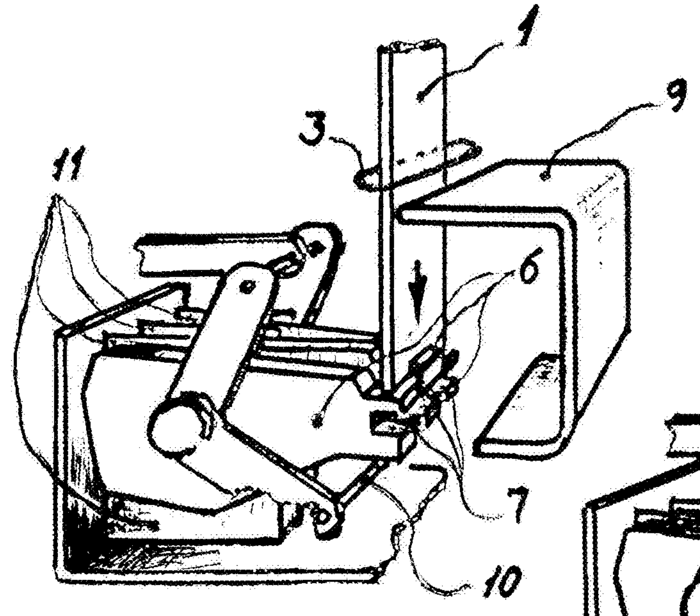
FIG. 7 shows a lock embodying the invention with the key inside the lock.
Figure 8:
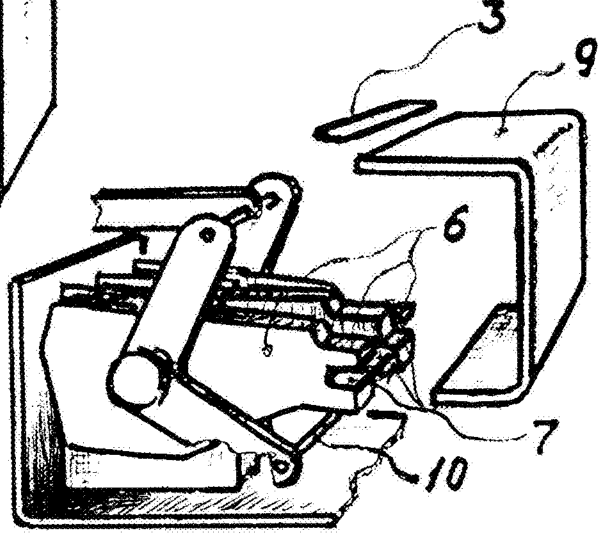
FIG. 8 shows a lock embodying the invention with the key removed from the lock.
Figure 9:
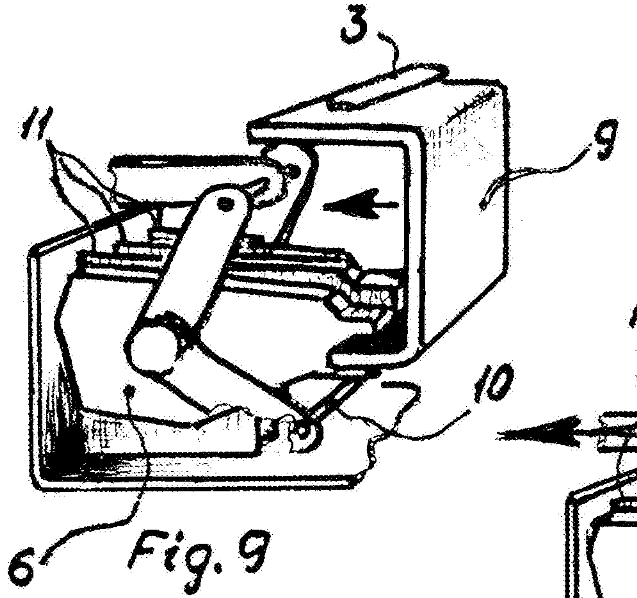
FIG. 9 shows opening of a lock embodying the invention.
Figure 10:
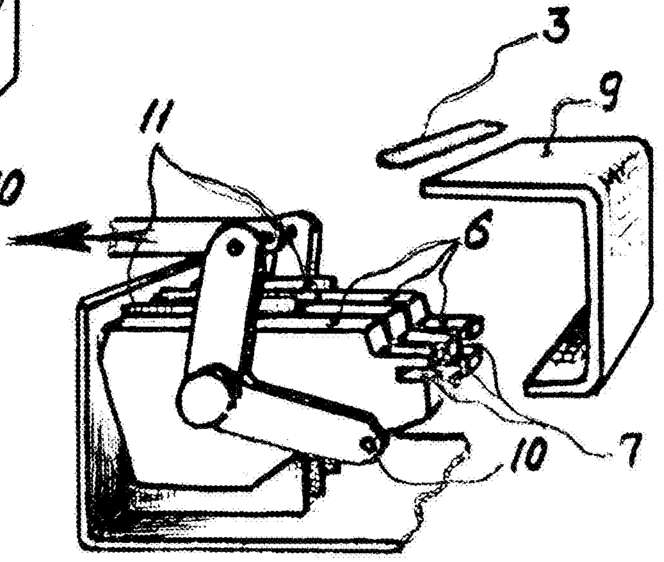
FIG. 10 shows of a lock embodying the invention in its locked configuration.

Unlike the methods of using the tumblers described hereinabove, the disclosed methods allow the tumblers to maintain their positions set by their contact with a key after the key is removed from the lock. The disclosed method implements well-known principles of functioning of contour gauge, where its parts maintain the contour of the surface against which they had been pressed before. Unlike the opening process for the locks currently in use performed with a key continuously inside the lock, under the disclosed method the entire opening process is divided in two stages, where the key is used only the first stage.

The first stage is the preparation for the opening. A key is inserted into a keyhole pushes the tumblers and aligns the tumblers according to the key's blade contour coded for the specific lock. After this the key is removed from the lock, and, as described above, the key has made a stable imprint by its blade; the positions of the tumblers remain stable in their configuration. The key, after being removed from the lock, leaves within the lock a stable imprint or duplicate for subsequent using in the next step when the actual lock opening will take place.

The second stage is the actual lock opening. In the process of opening a mechanical lock, a key does not participate in the process. The lock's mechanism tests whether the set configuration of the tumblers matches the correct configuration for the lock. The key set the tumblers in the position matching the coded contour of the key blade. In the disclosed method of tumblers' functioning, the actual opening proceeds in the same way: the lock's mechanism tests whether the set configuration of the tumblers matches the correct configuration for the lock, but there is no necessity to hold the tumblers in the position by the key after the key set the positions of the tumblers; tumblers by themselves, without the key present, stay in their positions set in the first stage. The disclosed method allows accomplishing the actual lock opening with no key in the keyhole 3. The process of the actual lock opening is shown in FIGS. 2-9. A user rotates the handle 13 rigidly connected with a cam 15 and lever 19; the cam 15 pushes the castor 16, attached to the fence 9, the fence 9 moves into the notches 7 of the tumblers 6. If the tumblers 6 are aligned by a correct key 1, the fence 9 freely moves into the notches 7, and the handle 13 rotates further so that the lever 19 moves the bolt 14 to open the lock. In the case of an incorrect key 1, the fence 9 cannot enter into the notches 7, and the handle 13 is stopped making the opening of the bolt 14 impossible.

In locks shown in FIG. 1, the force vectors of action from the springs 4 and the key 1 are opposite, elimination of one of these forces leaves the other force present. Unlike the locks shown in FIG. 1, in FIG. 4 the force vectors of the spring 4 keeping the tumblers together and of the key 1 pushing the tumblers, are at 90 degrees to each other. The tumblers 6 are clamped by a side pressure perpendicular to the force from the key 1. That side pressure on the tumblers 6 creates a friction keeping the tumblers 6 together and preventing them from changing their positions after the key is removed. The friction force is strong enough to make the tumblers 6 remain in their positions with the key 1 is absent and at the same time make the tumblers 6 move easily by the pressure from the key 1. The friction force can be adjusted by changing the strength of the spring 4, or quality and smoothness of the surfaces of the tumbles in contact with each other.

In FIG. 1 a key inserted into a lock interacts with the set of tumblers in the same way as with a well-known contour/profile gauge and sets the tumblers in configuration according to coded contour of the key's blade. But, unlike the contour gauge, where the pins stay in their positions when they are disconnected from the gauged surface to which the pins had been pressed, the tumblers of the lock in FIG. 1 are not able to preserve their positions after being disconnected from the key. This happens because the tumblers in the lock in FIG. 1 are loaded with their individual springs, and, as soon as they are no longer in contact with the key, the springs drive the tumblers/pins back to their initial positions. So, to accomplish the lock opening in FIG. 1, the key has to be in permanent contact with the tumblers/pins, and this means that the lock opening process has to be performed with a keyhole open for the inserted key.

The disclosed method uses a contour/profile gauge principle giving the tumblers the ability to remain in their position after the key has been removed from the lock after interacting with the tumblers.

In the disclosed embodiment the tumblers are located in a clamp without individual springs forcing them back into their initial position; instead the tumblers are pressed to each other in the clamp which by a friction force between the tumblers necessary to keep them together and prevent them from changing their position after they are no longer in contact with a key. At the same time, the friction allows tumblers to move easily under the pressure from the key. That tension from the clamp can be provided in the same way as in clamps generally: by a spring, by a screw, or by another design of the clamp.

The disclosed embodiment, the key, inserted into a lock, interacts with tumblers like with a contour gauge and aligns them in a steady configuration that represents the key's coded portion. The key, after being removed from the lock, leaves its imprint as a stable configuration of tumblers.

After the key leaves its imprint, the key is removed from the lock and the lock's mechanism is ready to use that key's imprint for the actual opening of the lock.

In the disclosed embodiment, the lock opening process runs in two stages: at first, a person inserts a key into the keyhole all the way and then removes the key from the lock. As the result, the key's coded part pushes the tumblers and configures them in the position corresponding to the coded profile of the key's edge. That composition of tumblers remains unchanged after the user removes the key from the lock.

After the first stage is finished, the key has formed an imprint of its coded part on the set of tumblers ready to be used for the actual lock opening.

At the second stage, the actual opening takes place. The user twists the lock's handle or knob, and the lock mechanism verifies whether the configuration of the tumblers is the configuration necessary to open the lock. The lock mechanism uses the same method of the verification as other mechanical locks.

The actual opening takes place with the keyhole blocked to prevent any object entering the keyhole. The keyhole is closed during the actual opening.

The disclosed embodiment creates inside the lock an imprint of the key. The actual opening uses the key's imprint so that the keyhole does not need to be open. Otherwise, the open keyhole during the actual opening would make the lock vulnerable to pick tools.

The tumblers holding power may be adjusted by changing the strength of the spring or by changing the friction or smoothness of the rubbing surfaces of the tumblers.

The actual opening is when the lock's mechanism verifies if the position of tumblers formed by the key is correct. That operation in the present disclosure differs from the operation for the locks shown in FIG. 1 in that the key does not participate in the actual opening, because it has already performed its role when the key has configured the tumblers in accordance with the coded blade, and the tumblers maintain their configuration for the actual opening.

This is the fundamental change in comparison with the opening used in the lock shown in FIG. 1.

In the beginning of the actual opening, the user twists the lock's handle to move the bolt in the open position. The flap of the fence blocks the keyhole. As the lock's handle keeps rotating, the actual opening proceeds without a key using the key's imprint while the keyhole is blocked.

The actual opening in the disclosed embodiment uses the principle as the locks shown in FIG. 1: if the tumblers are configured by a correct key, the lock is opened.

The shown embodiment requires an additional operation after the lock is open: the composition of the tumblers formed with a key at the preparation phase, the imprint of the key, has to be eliminated by bringing the tumblers to their initial shape. This prepares the lock's mechanism for the next cycle of opening. This can be easy done with a combination of cams and levers propelled by the opening movement of the bolt or handle shaft.

The present invention makes it impossible to use pick tools even when the keyhole is open (before the actual opening, for example): one can reach the tumblers with a pick and change their position, but it is impossible to check simultaneously whether the new position, just set with a pick, is the correct position for the lock's opening; because as soon as the lock's handle is turned in an attempt to retract the bolt, the flap of the fence 9, that is connected with the handle shaft, jams the pick in the keyhole. So, the lock picker is forced after every change of the tumblers' positions to remove the pick tool from the lock and then to move the lock's handle, which would take an unacceptable amount time: months of continuous attempts of lock picking, because the set of even 5 tumblers, pins, or levers can form hundreds of thousands of combinations of the tumblers' positions.

The springs act on the tumblers right transversely to their movement under the key's pressure, so, if the key does not push the tumblers, —the whole tumbler's package stays pressed to the side base—B as a solid piece. The diaphragms isolate the tumblers from each other—so, the movement of one of them is not transmitted to the adjacent ones.

In contrast with the locks described in the Background section, the present invention allows the tumblers to preserve their position or configuration after their contact with the key, and to maintain their configuration after the key is removed from the lock and after the keyhole is blocked. The tumblers function similarly to a contour gauge. The tumblers preserve the shape of the surface of the key, to which they were pressed.

Unlike the locks that require the key to stay in the keyhole for the entire duration of the opening process, some embodiments of the present invention split the opening process into two phases; only the first phase requires the key to be present in the keyhole.

The Preparatory Phase

A key is inserted into a keyhole. The key pushes the tumblers and aligns them in accordance with the key's blade contour. Then the key is removed from the lock.

The tumblers interact with the key similarly to a contour gauge, and maintain their alignment, for example, by friction. Therefore, the key leaves an imprint as the configuration or alignment of the tumblers.

The Actual Opening Phase

The user rotates the lock's handle. First, the keyhole is blocked by a flap of the fence 9, regardless of the key or tumblers' configuration; this prevents access to the lock mechanism via the keyhole.

The user continues rotating the lock's handle. This tests whether the key imprint, as the configuration of the tumblers matches the lock configuration.

The lock is configured so that its opening requires that the notches 17 align along a straight line. Only when the notches are aligned, a flap of the fence 9 moves to the right far enough to move the latch to open the lock.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A lock openable with a key, comprising:

a keyhole;

movable tumblers with notches movable by the key to be aligned with each other and capable of maintaining their positions without the key being in the keyhole;

a fence movable into the notches aligned with each other; and a flap capable of blocking the keyhole without the fence being within the notches, wherein the fence is movable into the notches only when the flap blocks the keyhole.

2. A method of opening a lock with a key, comprising inserting the key into a keyhole in the lock;

bringing the key in contact with tumblers to change positions of the tumblers to align notches on the tumblers with respect to each other;

removing the key so that the positions of the tumblers with respect to each other is maintained without contact with the key;

blocking the keyhole with a flap; and after the keyhole is blocked, moving a fence into aligned notches to open the lock, wherein the fence is movable into the notches only when the flap blocks the keyhole.

3. The method of claim 2, wherein the tumblers are pin tumblers.

4. The method of claim 2, wherein the tumblers are lever tumblers.

5. The method of claim 2, wherein the positions of the tumblers with respect to each other are maintained by friction between the tumblers.

* * * * *